United States Patent
Eimura et al.

(10) Patent No.: US 11,103,835 B2
(45) Date of Patent: Aug. 31, 2021

(54) SEPARATION FILM AND PRODUCTION METHOD THEREFOR

(71) Applicant: TORAY INDUSTRIES, INC., Tokyo (JP)

(72) Inventors: Hiroki Eimura, Shiga (JP); Gohei Yamamura, Shiga (JP); Koichi Takada, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 45 days.

(21) Appl. No.: 16/498,802

(22) PCT Filed: Mar. 30, 2018

(86) PCT No.: PCT/JP2018/014002
§ 371 (c)(1),
(2) Date: Sep. 27, 2019

(87) PCT Pub. No.: WO2018/182028
PCT Pub. Date: Oct. 4, 2018

(65) Prior Publication Data
US 2020/0023321 A1    Jan. 23, 2020

(30) Foreign Application Priority Data
Mar. 30, 2017   (JP) .............................. JP2017-067097

(51) Int. Cl.
*B01D 71/18* (2006.01)
*B01D 67/00* (2006.01)
*B01D 69/02* (2006.01)

(52) U.S. Cl.
CPC ........... *B01D 71/18* (2013.01); *B01D 67/002* (2013.01); *B01D 67/0023* (2013.01); *B01D 67/0088* (2013.01); *B01D 69/02* (2013.01); *B01D 2323/18* (2013.01); *B01D 2323/20* (2013.01); *B01D 2325/24* (2013.01)

(58) Field of Classification Search
CPC .. B01D 71/18; B01D 2325/24; B01D 67/002; B01D 67/0023; B01D 67/0088; B01D 69/02; B01D 2323/18; B01D 2323/20; B01D 2325/026; B01D 69/082; B01D 71/14; D01F 2/28

See application file for complete search history.

(56) References Cited

U.S. PATENT DOCUMENTS

| | | | |
|---|---|---|---|
| 4,388,256 A | 6/1983 | Ishida et al. | |
| 2015/0018442 A1 | 1/2015 | Kim et al. | |
| 2017/0296984 A1 | 10/2017 | Yamamura et al. | |
| 2018/0065093 A1 | 3/2018 | Takada et al. | |
| 2020/0197880 A1 | 6/2020 | Takada et al. | |

FOREIGN PATENT DOCUMENTS

| | | |
|---|---|---|
| CN | 1395983 A | 2/2003 |
| CN | 134093774 A | 10/2014 |
| JP | 55-71810 A | 5/1980 |
| JP | 6-17307 A | 1/1994 |
| JP | 7-60083 A | 3/1995 |
| JP | 8-108053 A | 4/1996 |
| JP | 2002-306937 A | 10/2002 |
| JP | 2004-331881 A | 11/2004 |
| JP | 2014-128793 A | 7/2014 |
| WO | WO 2009/060836 A1 | 5/2009 |
| WO | WO 2016/052675 A1 | 4/2016 |
| WO | WO 2016/159333 A1 | 10/2016 |

OTHER PUBLICATIONS

Indian Office Action for Indian Application No. 201947039525, dated Jul. 17, 2020.
Alebel Gebru, K. and C. Das, "Effects of solubility parameter differences among PEG, PVP and CA on the preparation of ultrafiltration membranes: Impacts of solvents and additives on morphology, permeability and fouling performances," Chinese Journal of Chemical Engineering (2017), vol. 25, pp. 911-923.
Chou et al., "Effect of molecular weight and concentration of PEG additives on morphology and permeation performance of cellulose acetate hollow fibers," Separation and Purification Technology (2007), vol. 57, pp. 209-219.
Extended European Search Report dated Nov. 13, 2020, in European Patent Application No. 18776840.3.
Guillen et al. "Preparation and Characterization of Membranes Formed by Nonsolvent Induced Phase Separation: A Review", Industrial & Engineering Chemistry Research, 2011, vol. 50, p. 3798-3817.
International Search Report, issued in PCT/JP2018/014002, PCT/ISA/210, dated Jun. 26, 2018.
Written Opinion of the International Searching Authority, issued in PCT/JP2018/014002, PCT/ISA/237, dated Jun. 26, 2018.
Office Action dated Apr. 23, 2021, in Republic of Korea Patent Application No. 10-2019-7028570.
Chinese Office Action and Search Report for Chinese Application No. 201880023092.1, dated April 30, 2021, with English translation of the Office Action.

*Primary Examiner* — Krishnan S Menon
(74) *Attorney, Agent, or Firm* — Birch, Stewart, Kolasch & Birch, LLP

(57) ABSTRACT

The purpose of the present invention is to provide: a separation film that consists primarily of a cellulose ester and has a high membrane strength and a high elongation degree; and a production method therefor. Provided is a separation film which has a structure comprising a cellulose ester phase and pores, wherein the average pore diameter R is 0.001-6 µm, the value obtained from the expression: breaking strength (MPa)÷(100−porosity (%))×100 is 40 or greater, and the elongation degree is 10% or greater.

7 Claims, No Drawings

SEPARATION FILM AND PRODUCTION METHOD THEREFOR

TECHNICAL FIELD

The present invention relates to a separation membrane having high membrane strength and degree of elongation and containing a cellulose ester as a main component, and relates to a method for producing the same.

BACKGROUND ART

The separation membrane is used in a wide range of fields, such as water treatment membranes for removing turbidity matters or ions from river water, seawater, or wastewater to produce industrial water or drinking water; medical membranes for artificial kidneys, plasma separation, or the like; membranes for food-beverage industry, such as fruit juice concentration; and gas separation membranes for separating carbonic acid gas or the like.

Most of separation membranes are formed of a polymer as a material. Among them, cellulose-based resins are widely used as a separation membrane inclusive of water treatment membranes because cellulose-based resins have water permeation performance owing to their hydrophilicity and chlorine resistance such that they are strong against chlorine-based sterilizers.

For example, PTLs 1 and 2 and NPL 1 disclose the technique of obtaining a separation membrane by dissolving a resin composition including a cellulose ester and a pore-forming agent in an organic solvent and immersing the solution into a coagulation liquid including immersion water, to undergo phase separation.

According to the technique described in PTL 3, a separation membrane having a high membrane strength and having a homogenous structure in the thickness direction of the membrane.

CITATION LIST

Patent Literature

PTL 1: JP-A-2014-128793
PTL 2: JP-A-2004-331881
PTL 3: WO 2016/52675

Non-Patent Literature

NPL 1: Ind. Eng. Chem. Res. 2011, 50, 3798-3817

SUMMARY OF INVENTION

Technical Problem

When water is filtrated with a hollow fiber membrane over a long period of time, the membrane surface is soiled, and therefore, a periodical washing process called scrubbing becomes necessary. The scrubbing is a washing method in which by swaying the hollow fiber membrane with foams, the soil on the membrane surface is physically removed. But, the conventional membranes involve such a problem that thread breakage is frequently generated in the scrubbing.

Accordingly, an object of the present invention is to provide a separation membrane capable of withstanding scrubbing.

Solution to Problem

In order to solve the aforementioned problem, the present inventors made extensive and intensive investigations. As a result, it has been found that having not only a degree of elongation or strength but also both of them is effective to suppress breakage of the membrane in scrubbing, thereby leading to accomplishment of the present invention.

Specifically, the separation membrane of the present invention is a separation membrane including a cellulose ester as a main component, in which the separation membrane has a structure including a phase including the cellulose ester, and pores, has an average pore diameter R of the pores of 0.001 μm or more and 6 μm or less, has a breakage parameter expressed by the following Formula (1) of 40 or more:

$$\text{Breakage parameter} = [\{\text{Breaking Strength (MPa)}\} \div \{100-\text{porosity (\%)}\}] \times 100 \quad (1),$$

and has a degree of elongation of 10% or more.

Advantageous Effects of Invention

In accordance with the present invention, a separation membrane having high membrane strength and degree of elongation is provided. The separation membrane of the present invention can be preferably used for applications requiring high membrane strength and degree of elongation.

Specifically, the separation membrane of the present invention can be used for water treatment membranes to remove turbidity matters, bacteria, or viruses from river water, seawater, brackish water, sewage, drainage, or the like; medical membranes for artificial kidneys, plasma separation, or the like; membranes for food-beverage industry, such as fruit juice concentration; gas separation membranes for separating exhaust gas, carbonic acid gas, or the like; membranes for electronic industry, such as fuel cell separators; and so on. The separation membrane of the present invention can be preferably used for microfiltration membranes, ultrafiltration membranes, and the like in water treatment.

DESCRIPTION OF EMBODIMENTS

The separation membrane of the present embodiment is a separation membrane including a cellulose ester as a main component, in which the separation membrane has a structure including a phase including the cellulose ester, and pores, has an average pore diameter R of the pores of 0.001 μm or more and 6 μm or less, has a breakage parameter expressed by the following Formula (1) of 40 or more:

$$\text{Breakage parameter} = [\{\text{Breaking Strength (MPa)}\} \div \{100-\text{porosity (\%)}\}] \times 100 \quad (1),$$

and has a degree of elongation of 10% or more.
(Resin Composition Constituting Separation Membrane)
The separation membrane of the present invention can include the components described in the following (1) to (5).
(1) Cellulose Ester The separation membrane of the present invention includes a cellulose ester as a main component. The main component as referred to herein indicates a component which is included in the highest mass amount among all of the components of the resin composition constituting the separation membrane.

In the present invention, specific examples of the cellulose ester include cellulose esters, such as cellulose acetate, cellulose propionate, and cellulose butyrate; and cellulose-mixed esters, such as cellulose acetate propionate and cellulose acetate butyrate. Among those, cellulose acetate propionate is preferred from the viewpoint of processability of a resin molded product and membrane strength of the resulting separation membrane. The cellulose ester acetate propionate as referred to herein means a cellulose ester in which average degrees of substitution of the acetyl group and the propyl group are 0.1 or more, respectively.

The weight average molecular weight (Mw) of the cellulose ester is preferably 50,000 or more and 250,000 or less. When the weight average molecular weight (Mw) thereof is 50,000 or more, the cellulose ester is suppressed from thermally decomposing on melting at the time of production of the separation membrane and the membrane strength of the separation membrane can reach a practical level. When the weight average molecular weight (Mw) thereof is 250,000 or less, the melt viscosity does not become excessively high, leading to stable melt membrane formation. The weight average molecular weight (Mw) is a value calculated by GPC measurement. A calculation method thereof is described in detail in the section of Examples.

Each of the exemplified cellulose-mixed esters has an acetyl group and other acyl groups (e.g., a propionyl group and a butyryl group). In the cellulose-mixed ester which is contained in the separation membrane, it is preferred that the average degrees of substitution of the acetyl group and other acyl groups satisfy the following relations.

1.0≤[(Average degree of substitution of acetyl group)+(Average degree of substitution of other acyl groups)]≤3.0

0.1≤(Average degree of substitution of acetyl group)≤2.6

0.1≤(Average degree of substitution of other acyl groups)≤2.6

When the aforementioned relations are satisfied, permeation performance of the separation membrane and favorable thermal flowability on melting the resin composition constituting the separation membrane are realized. The average degree of substitution refers to the number of hydroxy groups to which the acyl groups (acetyl group and other acyl groups) are chemically bonded, among three hydroxy groups existing per glucose unit of the cellulose.

The separation membrane may contain only one kind of cellulose ester or may contain two or more kinds of cellulose esters.

The content of the cellulose ester in the separation membrane is preferably 70% by mass or more and 100% by mass or less, and more preferably 80% by mass or more and 100% by mass or less, and still more preferably 90% by mass or more and 100% by mass or less, when defining all of the components of the separation membrane as 100% by mass. When the content of the cellulose ester of the separation membrane is 70% by mass or more, the membrane strength of the separation membrane becomes sufficient.

The content of the cellulose ester in the raw material for forming the separation membrane is preferably 15% by mass or more and 90% by mass or less when defining the whole of components constituting the raw material for membrane formation as 100% by mass. When the content thereof is 15% by mass or more, the membrane strength of the separation membrane becomes favorable. On the other hand, when the content of the cellulose ester is 90% by mass or less, thermoplasticity and permeation performance of the separation membrane become favorable. The content thereof is more preferably 20% by mass or more, and still more preferably 30% by mass or more. In addition, the content of the cellulose ester is more preferably 70% by mass or less, and still more preferably 60% by mass or less.

(2) Plasticizer for Cellulose Ester

The resin composition constituting the separation membrane of the present invention may contain a plasticizer for the cellulose ester.

The plasticizer for the cellulose ester is not particularly limited so long as it is a compound capable of thermally plasticizing the cellulose ester. In addition, the plasticizer may be used alone or may be used in combination of two or more kinds thereof.

Specific examples of the plasticizer for the cellulose ester include polyalkylene glycol-based compounds such as polyethylene glycol and a polyethylene glycol fatty acid ester; glycerin-based compounds such a glycerin fatty acid ester and a diglycerin fatty acid ester; fatty acid ester-based compounds such as a citric acid ester-based compound, a phosphoric acid ester-based compound, and an adipic acid ester; caprolactone-based compounds; and derivatives thereof.

Specific examples of the polyalkylene glycol-based compound include polyethylene glycol, polypropylene glycol, and polybutylene glycol, each having a weight average molecular weight (Mw) of 400 or more and 4,000 or less.

After forming the separation membrane, the plasticizer for the cellulose ester may be allowed to remain in the separation membrane or may be eluted from the separation membrane. In the case of eluting the plasticizer, traces formed by elution of the plasticizer may occasionally become pores in the membrane, and as a result, the permeation performance becomes favorable.

It is preferred that the plasticizer for the cellulose ester is contained in an amount of 5% by mass or more and 40% by mass or less when defining the whole of components constituting the raw material for membrane formation as 100% by mass.

When the content thereof is 5% by mass or more, the thermoplasticity of the cellulose ester and the permeation performance of the separation membrane become favorable. When the content of the plasticizer for the cellulose ester is 40% by mass or less, the membrane strength of the separation membrane becomes favorable. The content of the plasticizer for the cellulose ester is more preferably 10% by mass or more and 35% by mass or less, and still more preferably 15% by mass or more and 30% by mass or less.

(3) Antioxidant

It is preferred that the resin composition serving as the raw material of the separation membrane of the present invention contains an antioxidant. When the resin composition contains the antioxidant, the thermal decomposition on the occasion of melting the polymer at the time of production of the separation membrane is suppressed, and as a result, the membrane strength of the resulting separation membrane is improved, and coloration of the separation membrane is suppressed.

As the antioxidant, a phosphorus-based antioxidant is preferred, and a pentaerythritol-based compound is more preferred. Examples of the pentaerythritol-based compound include bis(2,6-di-t-butyl-4-methylphenyl)pentaerythritol diphosphite.

The content of the antioxidant is preferably 0.005% by mass or more and 0.500% by mass or less when defining all of the components of the resin composition as 100% by mass. When the content of the antioxidant is in a range of 0.005% by mass or more and 0.500% by mass or less, a homogeneous resin composition can be obtained in a preparation step of the resin composition.

(4) Structure-Forming Agent

The resin composition constituting the separation membrane of the present invention may contain a structure-forming agent.

The structure-forming agent in the present invention may be any one so long as it is able to be eluted or decomposed with a solvent after being mixed with the cellulose ester to form a membrane.

The structure-forming agent in the present invention is preferably a compound which is soluble in water or has a smaller contact angle with water than that of the cellulose ester to be contained in the separation membrane, from the standpoint that it is able to be easily eluted.

Specific examples of the structure-forming agent include polyvinylpyrrolidone (hereinafter referred to as "PVP"), copolymers on a basis of PVP, such as a PVP/vinyl acetate copolymer and a PVP/methyl methacrylate copolymer, polyvinyl alcohol, and polyester-based compounds. These can be used either alone or in combination thereof.

When thermal crosslinking is generated, PVP is hardly eluted from the separation membrane. Therefore, the weight average molecular weight (Mw) of PVP is preferably 20,000 or less from the viewpoint that not only intermolecular crosslinking is relatively hard to proceed, but also even when crosslinked, it is able to be eluted. In addition, use of the copolymer on a basis of PVP as described in the preceding paragraph is also preferred from the standpoint that the thermal crosslinking is suppressed.

After forming the separation membrane, a part of the structure-forming agent may be allowed to remain in the separation membrane, or the structure-forming agent is preferably eluted from the separation membrane. In the case of eluting the structure-forming agent, traces formed by elution of the structure-forming agent may occasionally become pores, and as a result, the permeation performance becomes favorable.

The content of the structure-forming agent is preferably 20% by mass or more and 80% by mass or less on the occasion of defining the whole of components constituting the raw material for membrane formation as 100% by mass.

When the content thereof is 20% by mass or more, the permeation performance of the separation membrane becomes favorable. When the content of the structure-forming agent is 80% by mass or less, the membrane strength becomes favorable. The content of the structure-forming agent is more preferably 30% by mass or more, and still more preferably 40% by mass or more. In addition, the content of the structure-forming agent is more preferably 75% by mass or less, and still more preferably 70% by mass or less.

(5) Additive

The resin composition constituting the separation membrane of the present invention may contain an additive other than the components described in (1) to (4) within a range where the effect of the present invention is not impaired.

Specific examples of the additive include resins such as cellulose ether, polyacrylonitrile, a polyolefin, a polyvinyl compound, a polycarbonate, a poly(meth)acrylate, polysulfone, and polyethersulfone, an organic lubricant, a crystal nucleating agent, organic particles, inorganic particles, a terminal blocking agent, a chain extender, an ultraviolet absorber, an infrared absorber, a coloration preventing agent, a delustering agent, an antimicrobial agent, an electrification suppressing agent, a deodorant, a flame retardant, a weather-resistant agent, an antistatic agent, an antioxidant, an ion-exchanging agent, an antifoaming agent, a color pigment, a fluorescent whitening agent, and a dye.

(Membrane Shape)

Although the shape of the separation membrane of the present invention is not particularly limited, a separation membrane having a hollow fiber shape (hereinafter referred to as "hollow fiber membrane") or a membrane having a planner shape (hereinafter referred to as "flat membrane") is preferably adopted. Of these, the hollow fiber membrane is more preferred because it is able to be efficiently loaded in a module and to enlarge an effective membrane area per unit volume of the module.

The thickness of the separation membrane is preferably 10 μm or more and 500 μm or less from the viewpoint of making both the permeation performance and the membrane strength compatible with each other.

In the case of the hollow fiber membrane, the outer diameter of the hollow fiber membrane is preferably 50 μm or more and 2,500 μm or less from the viewpoint of making both the effective membrane area and the membrane strength on the occasion of filling in the module compatible with each other. The outer diameter of the hollow fiber membrane is more preferably 100 μm or more, still more preferably 200 μm or more, and especially preferably 300 μm or more. In addition, the outer diameter of the hollow fiber membrane is more preferably 2,000 μm or less, still more preferably 1,500 μm or less, and especially preferably 1,000 μm or less.

In the case of the hollow fiber membrane, the percentage of hollowness of the hollow fiber is preferably 15% or more and 70% or less, more preferably 20% or more and 65% or less, and still more preferably 25% by or more and 60% or less, in view of the relationship between the pressure loss of a fluid flowing through a hollow part and the buckling pressure.

A method for allowing the outer diameter or percentage of hollowness of the hollow fiber membrane to fall within the aforementioned range is not particularly limited. However, the outer diameter or percentage of hollowness can be controlled, for example, by appropriately changing the shape of a discharge hole of a spinneret for producing the hollow fiber or the draft ratio which can be calculated in terms of winding rate/discharge rate.

(Cross-Sectional Membrane Structure)

It is preferred that the separation membrane of the present invention has a homogenous porous structure. This homogeneous porous structure is defined in terms of distribution of pore diameter.

As for the method for calculating the pore diameter of the separation membrane, first of all, the cross section in the thickness direction of the separation membrane is observed with a scanning electron microscope at a magnification of 1,000 or more and 100,000 or less.

The separation membrane is divided at equal intervals into 5 successively in the thickness direction from one surface of the separation membrane, thereby setting respective regions 1 to 5. In each of the set regions, the pore diameters of all pores in a quadrate microscopic image observed while making the center of each region as a center of the microscopic field are calculated, and an arithmetic average of values of n pores, i.e., $r_1$ to $r_n$, is defined as an average pore diameter R of the separation membrane. One side of the microscopic image is defined as a length at which the number of pores is 30 or more.

Here, the pore diameter r of each pore is calculated according to the following formula by measuring an area of the pore by means of image processing and hypothesizing a pore of true circle having the same area.

$$r=(4 \times A/\pi)^{0.5}$$

A: Area of pore

The homogeneous porous structure means a structure in which among $r_1$ to $r_n$, $r_i$ satisfying a relation of $(-0.5<(r_i-R)/R<0.5)$ is existent in the number larger than n/2.

When the separation membrane has the homogeneous porous structure, the removal performance of the separation membrane becomes favorable, and a high membrane strength is revealed.

The average pore diameter R of the separation membrane of the present invention is 0.001 μm or more and 6 μm or less. In order to impart favorable permeation performance and removal performance to the separation membrane, the average pore diameter R is preferably 0.001 μm or more and 1 μm or less.

In the separation membrane of the present invention, it is more preferred that the phase containing the cellulose ester and the pores take a bicontinuous structure. The bicontinuous structure as referred to herein indicates a state in which when observing the membrane cross section with a transmission electron microscope (TEM) or a scanning electron microscope (SEM), the phase containing the cellulose ester and the pores are continued respectively, and also three-dimensionally incorporated into each other. A bicontinuous structure is schematically illustrated in, for example, Polymer alloy—Basic and Application: Second edition (Chapter 10.1) (edited by The Society of Polymer Science, Japan, published by Tokyo Kagaku Dojin Co., Ltd.). Specifically, the bicontinuous structure is defined from Fourier transform data from a microscopic image, which is plots of the intensity with the wavenumber. The microscopic image for the Fourier transformation is photographed in the quadrate field with one side having a length of 10 times or more and 100 times or less of a width of the pore diameter of the separation membrane. The bicontinuous structure indicates a structure in which when defining a peak half-value width as (a) and a maximum wavenumber of peak as (b) in the Fourier transform plots, respectively, a relation of (0<(a)/(b)<1.5) is satisfied. When the separation membrane has the bicontinuous structure, the average pore diameter is (b)/2.

In the phase constituted of the aforementioned plasticizer and the aforementioned structure-forming agent, the pores are formed by removing at least a part of the plasticizer and the structure-forming agent as mentioned later. The average pore diameter of the bicontinuous structure is in a range of 0.001 μm or more and 6 μm or less. When the average pore diameter of the bicontinuous structure is 1 nm or more and 100 nm or less, the favorable separation performance as the separation membrane can be exhibited.

(Membrane Strength)

In general, as the porosity of the membrane is larger, a ratio of the solid portion supporting the membrane is smaller, and therefore, the strength of the membrane becomes low.

In this specification, the strength of the membrane is not evaluated merely in terms of a breaking strength but evaluated in terms of a breakage parameter also taking into consideration the porosity. The breakage parameter is a numerical value expressed by the following Formula (1).

$$\text{Breakage parameter}=[\{\text{Breaking strength (MPa)}\}\div\{100-\text{porosity (\%)}\}]\times 100 \quad (1)$$

In the separation membrane of the present invention, the breakage parameter is 40 or more. The breakage parameter is more preferably 50 or more. Although a method for adjusting the breakage parameter to 40 or more is not particularly limited, for example, the adjustment is achieved by the production method including a step of immersing the resin composition in a solvent as mentioned later.

(Degree of Elongation)

When water is filtrated with the hollow fiber membrane over a long period of time during filtration, the membrane surface is soiled, and therefore, a periodical washing process called scrubbing becomes necessary. The scrubbing is a washing method of swaying the hollow fiber membrane with foams, thereby physically removing soils of the membrane surface. In order to prevent thread breakage on washing, the hollow fiber membrane is required to have not only a high membrane strength but also a high degree of elongation. The degree of elongation of the separation membrane of the present invention is 10% or more, and more preferably 25% or more. A specific measurement method thereof is described in the section of Examples.

(Degree of Orientation)

The separation membrane of the present invention preferably has a degree of orientation of 1.05 or more and 1.50 or less. When the degree of orientation thereof falls within the aforementioned range, both favorable breaking strength and degree of elongation can be made compatible with each other. Here, the degree of orientation is measured through FT-IR. A specific measurement method thereof is described in the section of Examples.

(Crystal Melting Temperature and Crystal Melting Heat Amount)

In the separation membrane of the present invention, the crystal melting temperature is preferably 200° C. or higher, and more preferably 210° C. or higher. In addition, the crystal melting heat amount is preferably 5.0 J/g or more. Here, the crystal melting temperature is a melting peak temperature in the case of raising the temperature at a temperature rise rate of 10° C./min through differential scanning calorimetry (DSC). The crystal melting heat amount is a melting heat amount at 200° C. or higher in the case of raising the temperature at a temperature rise rate of 10° C./min through differential scanning calorimetry (DSC). When the crystal melting temperature and the crystal melting heat amount fall within the aforementioned ranges, respectively, a structure in which molecular chains are aggregated is formed, whereby a high membrane strength can be exhibited. In addition, the melting peak temperature is more preferably lower than 280° C. When the melting peak temperature is 280° C. or higher, a homogeneous resin composition cannot be made in a preparation step of the resin composition as described below, and the finally obtained separation membrane cannot exhibit a sufficient strength.

(Crystallinity)

In the separation membrane of the present invention, it is preferred that the crystallinity measured in a wide angle X-ray diffractometer is 1.5 or more. When the crystallinity is less than 1.5, suppression of motility of molecular chains is insufficient, and a high membrane strength cannot be exhibited. The crystallinity as referred to herein is a ratio of diffraction peak intensity at which a diffraction angle 2θ is 8° to an X-ray diffraction intensity peak at which the diffraction angle 2θ is 20.5° in the X-ray diffraction measurement.

(Relaxation Time of Solid NMR)

As for the separation membrane of the present invention, in a relaxation time $T_1C$ measured in the solid-state high-resolution nuclear magnetic resonance spectroscopy (NMR), it is preferred that a relaxation time (τ1) of carbonyl carbon and a relaxation time (τ2) of carbon at the 6-position of glucose ring satisfy the following Relation (2).

$$2.6 \leq \tau1/\tau2 \tag{2}$$

When the (τ1/τ2) is less than 2.6, suppression of motility of molecular chains is insufficient, and a high membrane strength cannot be exhibited.

(Production Method)

A method for producing the separation membrane of the present invention includes:

(1) a resin composition preparation step of melt-kneading 10% by mass or more and 90% by mass or less of a cellulose ester with 10% by mass or more and 90% by mass or less of a structure-forming agent, to prepare a resin composition, (2) a forming step of discharging the aforementioned resin composition from a discharge spinneret, to form a resin molded product, and (3) an immersion step of immersing the aforementioned resin molded product in a solvent having a solubility parameter distance (D) to the cellulose ester in a range of 10 or more and 25 or less.

The method for producing the separation membrane of the present invention may include, after the step (2), a drawing step of drawing the aforementioned resin molded product.

Next, the method for producing the separation membrane of the present invention is specifically described by reference to the case where the separation membrane is a hollow fiber membrane, but it should be construed that the present invention is not limited thereto.

In the resin composition preparation step of obtaining the resin composition for membrane formation of the separation membrane of the present invention, a method of melt-kneading 10% by mass or more and 90% by mass or less of the cellulose ester with 10% by mass or more and 90% by mass or less of the structure-forming agent is adopted, and preferably, a method of melt-kneading 20% by mass or more and 80% by mass or less of the cellulose ester with 20% by mass or more and 80% by mass or less of the structure-forming agent is adopted. The plasticizer for the cellulose ester, the antioxidant, or the additive of the aforementioned type and content can be contained therein, as the need arises.

An apparatus to be used is not particularly limited, and a known mixing machine such as a kneader, a roll mill, a Banbury mixer, and a single-screw or twin-screw extruder, can be used. Above all, use of a twin-screw extruder is preferred from the viewpoint of making dispersibility of the structure-forming agent or the plasticizer favorable. Use of a twin-screw extruder with a vent is more preferred from the viewpoint that a volatile matter such as moisture and a low-molecular weight material, can be removed.

The resulting resin composition may be used for melt membrane formation upon being once pelletized and again melted, or may be used for melt membrane formation upon being introduced directly into the spinneret. On the occasion of being once pelletized, it is preferred to use the resin composition obtained by drying the pellets to control the moisture content to 200 ppm (on a mass basis) or less. By controlling the moisture content to 200 ppm (on a mass basis) or less, degradation of the resin can be suppressed.

The forming step is a step of discharging the resin composition obtained in the resin composition preparation step from the discharge spinneret, to form a resin molded product, and it may be a step of discharging the resin composition into air from a discharge spinneret having a double annular nozzle with a gas flow channel disposed in a central part thereof and cooling the discharged resin composition with a cooling apparatus, to form a resin molded product.

In the resin molded product, in order to improve the membrane strength by high orientation of the polymer, it is preferred to draw the resin molded product in the drawing step. The resin molded product may be subjected to the drawing step after it is once wound and then again unwound, or may be subjected directly to the drawing step. Examples of the drawing method include a method in which the resin molded product before drawing is heated up to a drawing temperature by transferring on heating rolls, and then drawn utilizing a difference in peripheral speed between the rolls; and a method in which the resin molded product before drawing is heated up to a drawing temperature by transferring in a drying and heating oven or in a heating liquid such as hot water and a solvent, and then drawn utilizing a difference in peripheral speed between the rolls. In addition, drawing may be performed in a single stage or in multiple stages of two or more stages.

The resin molded product is drawn preferably at 40° C. or higher and 180° C. or lower, more preferably 60° C. or higher and 160° C. or lower, and still more preferably 80° C. or higher and 140° C. or lower. In addition, the total draw ratio is preferably 1.2 times or more and 5.0 times or less, more preferably 1.4 times or more and 4.5 times or less, and still more preferably 1.6 times or more and 4.0 times or less. When the drawing temperature and the total draw ratio fall within the aforementioned ranges, respectively, the orientation of the polymer in the resin molded product can be enhanced.

The immersion step is a step of immersing the aforementioned resin molded product in a solvent whose solubility parameter distance (D) to the polymer as the raw material is 10 or more and 25 or less. On this occasion, a solvent or a mixed solvent with an appropriate affinity to the cellulose ester prevents the resin from extreme swelling or plasticization. Accordingly, the solvent penetrates into the resin composition while maintaining the shape of the resin. On this occasion, it is presumed that the plasticizer or pore-forming agent is eluted while the phase separation of the resin composition occurs. As the immersion time or temperature of the solvent is longer or higher, the porosity and pore size tend to become large, making the membrane strength lower. In the present invention, in obtaining the aforementioned separation membrane, selection of the solvent is especially important. A solvent having an affinity to the cellulose ester to a certain extent is preferred. The affinity between the cellulose ester and the solvent can be estimated by a three-dimensional Hansen solubility parameter (see NPL 1). Specifically, as the solubility parameter distance (D) according to the following Formula (3):

$$D = \sqrt{4(\delta_{Ad} - \delta_{Bd})^2 + (\delta_{Ap} - \delta_{Bp})^2 + (\delta_{Ah} - \delta_{Bh})^2} \tag{3}$$

is smaller, the affinity of the solvent to the cellulose ester becomes higher. Here, $\delta_{Ad}$, $\delta_{Ap}$, and $\delta_{Ah}$ are a dispersion term, a polar term, and a hydrogen bonding term of the solubility parameter of the cellulose ester, respectively; and $\delta_{Bd}$, $\delta_{Bp}$, and $\delta_{Bh}$ are a dispersion term, a polar term, and a hydrogen bonding term of the solubility parameter of the solvent or mixed solvent, respectively. The solubility parameter ($\delta_{Mixture}$) of the mixed solvent can be determined according to the following Formula (4).

$$\delta_{Mixture} = \Sigma \Phi_i \delta_i \tag{4}$$

Here, $\Phi_i$ and $\delta_i$ are a volume fraction and a solubility parameter of the component i, respectively and are set up regarding the dispersion term, the polar term, and the hydrogen bonding term, respectively. The "volume fraction of the component i" as referred to herein indicates a ratio of the volume of the component i before mixing to the sum of volumes of all components before mixing. As for the three-dimensional Hansen solubility parameter of the solvent, a value described in NPL 1 was adopted. With respect to non-described solubility parameters, values which are collected in a software "Hansen Solubility Parameter in Practice" developed by Charles Hansen, et al. were adopted. The three-dimensional Hansen solubility parameters of solvents or polymers not described even in the aforementioned software can be calculated through the Hansen sphere method using the above software.

In the present invention, as the solvent capable of immersing the formed product therein, a solvent whose D is 13 or more and 20 or less is preferred. As such a solvent, a mixed solvent of water and a solvent whose D is 4 or more and 12 or less is preferred, and specific examples thereof include mixed solvents of water and at least one selected from γ-butyrolactone, acetone, acetonitrile, 1,4-dioxane, methyl acetate, and tetrahydrofuran.

Although the resulting separation membrane can be used as it is, it is preferred that before the use, the membrane surface is hydrophilized with, for example, an alcohol-containing aqueous solution or an alkaline aqueous solution.

There can be thus produced the separation membrane of the present invention including a cellulose ester as a main component.

EXAMPLES

The present invention is hereunder specifically described by reference to Examples, but it should not be construed that the present invention is limited by these Examples.
(Measurement and Evaluation Methods)

The present invention is hereunder described in more detail by reference to the Examples. The respective characteristic values in the Examples are those determined by the following methods. It should not be construed that the present invention is limited to these Examples.
(1) Average Degree of Substitution of Cellulose-Mixed Ester A calculation method of the average degree of substitution of a cellulose-mixed ester in which an acetyl group and an acyl group are bonded to cellulose is as follows.

0.9 g of a cellulose-mixed ester which had been dried at 80° C. for 8 hours was weighed and dissolved by adding 35 mL of acetone and 15 mL of dimethyl sulfoxide, followed by adding 50 mL of acetone. 30 mL of a 0.5 N sodium hydroxide aqueous solution was added while stirring, followed by saponification for 2 hours. 50 mL of hot water was added, and a side surface of a flask was washed. Thereafter, titration was performed with 0.5 N sulfuric acid using phenolphthalein as an indicator. Separately, a blank test was performed by the same method as for the sample. After completion of the titration, a supernatant of the solution was diluted 100 times, and the composition of the organic acid was measured using an ion chromatograph. From the measurement results and the results of acid composition analysis with the ion chromatograph, the degrees of substitution were calculated by the following formulae.

$TA=(B-A)\times F/(1000\times W)$ $DSace=(162.14\times TA)/[\{1-(Mwace-(16.00+1.01))\times TA\}+\{1-(Mwacy-(16.00+1.01))\times TA\}\times(Acy/Ace)]$ $DSacy=DSace\times(Acy/Ace)$ TA: Total organic acid amount (mL)
A: Sample titration amount (mL)
B: Blank test titration amount (mL)
F: Titer of sulfuric acid
W: Sample weight (g)
DSace: Average degree of substitution of acetyl group
DSacy: Average degree of substitution of other acyl groups
Mwace: Molecular weight of acetic acid
Mwacy: Molecular weight of other organic acid
Acy/Ace: Molar ratio of acetic acid (Ace) and other organic acid (Acy)
162.14: Molecular weight of a repeating unit of cellulose
16.00: Atomic weight of oxygen
1.01: Atomic weight of hydrogen (2) Weight Average Molecular Weight (Mw) of Cellulose Ester A cellulose ester was completely dissolved in tetrahydrofuran to a concentration of 0.15% by mass, to prepare a sample for GPC measurement. Using this sample, GPC measurement was performed with Waters 2690 under the following conditions, to determine the weight average molecular weight (Mw) as expressed in terms of polystyrene.

Column: Two "TSK gel GMHHR-H columns" manufactured by Tosoh Corporation were connected to each other.
Detector: Waters 2410, differential refractometer RI
Solvent for mobile phase: Tetrahydrofuran
Flow rate: 1.0 mL/min
Injection amount: 200 μL (3) Average Pore Diameter A separation membrane was frozen with liquid nitrogen and then cut upon application of a stress such that a cross section of the separation membrane came out. On this occasion, in the case where the lengthwise direction of the separation membrane was unclear, the separation membrane was cut in an arbitrary direction. In addition, on cutting, a razor, a microtome, or the like was used, as the need arises. Subsequently, the resulting membrane cross section was observed with a scanning electron microscope or an atomic force microscope. On this occasion, the membrane cross section was observed while making the center of the membrane thickness direction as a center of the microscopic field. The separation membrane was divided at equal intervals into 5 successively in the thickness direction from one surface of the separation membrane, thereby setting respective regions 1 to 5. In each of the set regions, the pore diameters of all pores in a quadrate microscopic image observed while making the center of each region as a center of the microscopic field were calculated, and an arithmetic average of values of n pores, i.e., $r_1$ to $r_n$, was defined as an average pore diameter R of the separation membrane. One side of the microscopic image was defined as a length at which the number of pores in each region was 30 or more.

Here, the pore diameter r of each pore was calculated according to the following formula by measuring an area of the pore by means of image processing and hypothesizing a pore of true circle having the same area.

$r=(4\times A/\pi)^{0.5}$

A: Area of pore
(4) Thickness (μm) of Separation Membrane

A cross section of the membrane prepared in the above (3) was observed and photographed by an optical microscope, and the thickness (μm) of the separation membrane was calculated. The thickness of the separation membrane was observed and calculated at arbitrary 10 positions, and an average value thereof was obtained.

(5) Outer Diameter (μm) and Inner Diameter (μm) of Hollow Fiber Membrane

A cross section of the membrane prepared in the above (3) was observed and photographed by an optical microscope, and the outer diameter (μm) and the inner diameter (μm) of the hollow fiber membrane were calculated. The outer diameter of the hollow fiber membrane was observed and calculated at arbitrary 10 positions, and an average value thereof was obtained.

(6) Porosity (%)

After measuring the fiber length L (cm) of the hollow fiber membrane, the hollow fiber membrane was vacuum-dried at 25° C. for 8 hours and measured for its mass M (g). Using the outer diameter $R_1$ cm and the inner diameter $R_2$ cm as measured in the above (5), the density $\rho_1$ of the hollow fiber membrane was calculated according to the following Formula (5); and the porosity ε(%) was calculated according to the following Formula (6).

$$\rho_1 = M/[\pi \times \{(R_1/2)^2 - (R_2/2)^2\} \times L] \quad (5)$$

$$\varepsilon = \{1 - \rho_1/\rho_2\} \times 100 \quad (6)$$

Here, $\rho_2$ is a density: 1.28 (g/cm$^3$) of the cellulose ester obtained by after spinning, removing the plasticizer and the pore-forming agent by means of immersion in water, followed by vacuum-drying.

(7) Breaking Strength (MPa) and Degree of Elongation (%)

Using a tensile tester (Tensilon UCT-100, manufactured by Orientec Co., Ltd.), the tensile strength in the longitudinal direction of the separation membrane was measured in an environment at a temperature of 20° C. and a humidity of 65%. Specifically, measurement was performed under conditions of a sample length of 100 mm and a tension rate of 100 mm/min. The breaking strength (tensile strength) (MPa) and the degree of elongation (%) were calculated from the tensile strength and from the elongation, respectively. The measurement was repeated 5 times, and an average value thereof was obtained.

(8) Degree of Orientation

Using FT-IR (IRT-3000, manufactured by JASCO Corporation) equipped with a reflection ATR accessory and using a separation membrane samples which are vacuum-dried at 25° C. for 8 hours before measurement, S polarization ATR spectra were measured in the lengthwise direction (MD) and in the direction perpendicular to the lengthwise direction (TD) (in the width direction or the radial direction). The measurement was carried out using a Ge prism as an ATR crystal at an incident angle of 45° and in an integrated number of times of 256. In the case of a separation membrane containing cellulose acetate propionate as a main component, the intensities of a band in the vicinity of 1,050 cm$^{-1}$ (a pyranose ring (—C—O—C—)) and a band in the vicinity of 1,164 cm$^{-1}$ (an ester group (—C—O—)) were each measured in the MD and the TD of the separation membrane, respectively. At this time, when the band intensities in the vicinity of 1,050 cm$^{-1}$ in the MD and the TD were defined as $I_{P-MD}$ and $I_{P-TD}$, respectively, and the band intensities in the vicinity of 1,164 cm$^{-1}$ in the MD and the TD were defined as $I_{E-MD}$ and $I_{E-TD}$, respectively, the degree of orientation DO was calculated according to the following Formula (7).

$$DO = (I_{P-MD}/I_{E-MD})/(I_{P-TD}/I_{E-TD}) \quad (7)$$

When DO is 1 or more, the lengthwise direction is designated as the main orientation direction, and the degree of orientation in the main orientation direction is DO. When DO is less than 1, the direction perpendicular to the lengthwise direction is designated as the main orientation direction, the degree of orientation in the main orientation direction is defined to be 1/DO.

(9) Crystal Melting Temperature and Crystal Melting Heat Amount

Using DSC6200, manufactured by Seiko Instruments Inc., approximate 5 mg of a cellulose ester membrane which had been vacuum-dried under conditions at 50° C. for 8 hours was weighed, and the crystal melting heat amount of the cellulose ester was measured in a nitrogen atmosphere. A straight line connecting two points of ±20° C. from a melting peak temperature of the DSC curve was adopted as a base line to calculate the crystal melting heat amount. However, in the case where a plurality of melting peaks appeared, a higher temperature was designated as the crystal melting temperature, and a straight line connecting two points between a point of [(peak temperature of the highest melting temperature of DSC curve)+20° C.] and a point of [(peak temperature of the lowest melting temperature of DSC curve)−20° C.] was adopted.

(10) Crystallinity

Using D8ADVANCE, manufactured by Bruker, the crystallinity of the cellulose ester was calculated from the obtained X-ray diffraction pattern. The crystallinity means a ratio of a diffraction peak intensity at the diffraction angle 2θ of 8° to an X-ray diffraction intensity peak at the diffraction angle 2θ of 20.5° in the X-ray diffraction pattern. A straight line connecting a minimum point around the diffraction angle 2θ of 5° to a point at the diffraction angle 2θ of 35° was adopted as a base line on the occasion of calculating the diffraction peak intensity.

(11) Relaxation Time ($T_1C$) of Solid NMR

For measurement of the relaxation time $T_1C$ by the solid-state high-resolution nuclear magnetic resonance spectroscopy (NMR), Avance 400, manufactured by Bruker Biospin was used as a measurement apparatus of the solid-state high-resolution NMR. The T1 measurement of the 13C nucleus was carried out in dry air under conditions at room temperature of 22° C., an observation frequency of 75.2 MHz, and a pulse width of 90° pulse of 4.2 μs for a contact time of 2 ms. The relaxation time $T_1C$ corresponding to the peak derived from carbonyl carbon in the vicinity of 172 ppm and the peak derived from carbon at the 6-position of glucose ring in the vicinity of 64 ppm was determined.

(Cellulose Ester (A))

Cellulose Ester (A1):

To 100 parts by mass of cellulose (cotton linter), 240 parts by mass of acetic acid and 67 parts by mass of propionic acid were added, followed by mixing at 50° C. for 30 minutes. After the mixture was cooled to room temperature, 172 parts by mass of acetic anhydride and 168 parts by mass of propionic anhydride which have been cooled in an ice bath were added as esterifying agents, and 4 parts by mass of sulfuric acid was added as an esterifying catalyst, followed by stirring for 150 minutes to perform an esterification reaction. When the temperature exceeded 40° C. in the esterification reaction, cooling was performed in a water bath.

After the reaction, a mixed solution of 100 parts by mass of acetic acid and 33 parts by mass of water was added as a reaction terminator over 20 minutes, to hydrolyze the excessive anhydrides. Thereafter, 333 parts by mass of acetic acid and 100 parts by mass of water were added, followed by heating and stirring at 80° C. for 1 hour. After completion of the reaction, an aqueous solution containing 6 parts by mass of sodium carbonate was added. Precipitated cellulose acetate propionate was filtered off, and subsequently, the residue was washed with water, followed by drying at 60° C. for 4 hours. The average degrees of substitution of an acetyl group and a propionyl group of the resulting cellulose acetate propionate were 1.9 and 0.7, respectively, and the weight average molecular weight (Mw) thereof was 178,000.

Cellulose ester (A2): Cellulose acetate propionate (CAP482, manufactured by Eastman Chemical Japan Ltd.)
(Plasticizer (B) of Cellulose Ester)

Plasticizer (B1): Polyethylene glycol, weight average molecular weight (Mw): 600 (Structure-Forming Agent (C))

Structure-forming agent (C1): PVP/vinyl acetate copolymer (Kollidon VA 64, manufactured by BASF Japan K.K.)
(Antioxidant (D))

Antioxidant (D1): Bis(2,6-di-t-butyl-4-methylphenyl) pentaerythritol diphosphite (Production of Separation Membrane)

Example 1

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. The spun fibers were drawn under conditions of a drawing temperature of 110° C. and a draw ratio of 1.25 times, and then, the separation membrane was immersed in a γ-butyrolactone aqueous solution having a volume fraction of 65% for one hour and further immersed in water for one hour or more, thereby eluting the plasticizer and the structure-forming agent. The physical properties of the resulting separation membrane are shown in Table 1.

Example 2

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in a γ-butyrolactone aqueous solution having a volume fraction of 65% for one hour and further immersed in water for one hour or more, thereby eluting the plasticizer and the structure-forming agent. The physical properties of the resulting separation membrane are shown in Table 1.

Example 3

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in a γ-butyrolactone aqueous solution having a volume fraction of 50% for one hour and further immersed in water for one hour or more, thereby eluting the plasticizer and the structure-forming agent. The physical properties of the resulting separation membrane are shown in Table 1.

Example 4

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in an acetone aqueous solution having a volume fraction of 65% for one hour and further immersed in water for one hour or more, thereby eluting the plasticizer and the structure-forming agent. The physical properties of the resulting separation membrane are shown in Table 1.

Example 5

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in an acetonitrile aqueous solution having a volume fraction of 65% for one hour and further immersed in water for one hour or more, thereby eluting the plasticizer and the structure-forming agent. The physical properties of the resulting separation membrane are shown in Table 1.

Example 6

50% by mass of the cellulose ester (A1), 19.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in a γ-butyrolactone aqueous solution having a volume fraction of 65% for one hour and further immersed in water for one hour or more, thereby eluting the plasticizer and the structure-forming agent. The physical properties of the resulting separation membrane are shown in Table 1.

Example 7

50% by mass of the cellulose ester (A1), 19.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in an acetone aqueous solution having a volume fraction of 65% for one hour and further immersed in water for one hour or more, thereby eluting the plasticizer and the structure-forming agent. The physical properties of the resulting separation membrane are shown in Table 1.

Example 8

30% by mass of the cellulose ester (A2), 9.9% by mass of the plasticizer (B1), 60% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in a γ-butyrolactone aqueous solution having a volume fraction of 55% for one hour and further immersed in water for one hour or more, thereby eluting the plasticizer and the structure-forming agent. The physical properties of the resulting separation membrane are shown in Table 1.

Example 9

30% by mass of the cellulose ester (A2), 9.9% by mass of the plasticizer (B1), 60% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in an acetone aqueous solution having a volume fraction of 55% for one hour and further immersed in water for one hour or more, thereby eluting the plasticizer and the structure-forming agent. The physical properties of the resulting separation membrane are shown in Table 1.

Example 10

20% by mass of the cellulose ester (A2), 9.9% by mass of the plasticizer (B1), 70% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in a γ-butyrolactone aqueous solution having a volume fraction of 55% for one hour and further immersed in water for one hour or more, thereby eluting the plasticizer and the structure-forming agent. The physical properties of the resulting separation membrane are shown in Table 1.

Example 11

20% by mass of the cellulose ester (A2), 9.9% by mass of the plasticizer (B1), 70% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. As for the resulting spun hollow fibers, the separation membrane was immersed in an acetone aqueous solution having a volume fraction of 55% for one hour and further immersed in water for one hour or more, thereby eluting the plasticizer and the structure-forming agent. The physical properties of the resulting separation membrane are shown in Table 1.

Comparative Example 1

40% by mass of the cellulose ester (A1), 29.9% by mass of the plasticizer (B1), 30% by mass of the structure-forming agent (C1), and 0.1% by mass of the antioxidant (D1) were melt-kneaded by a twin-screw extruder at 220° C., homogenized, and then pelletized to obtain a resin composition for melt-spinning. This resin composition was vacuum-dried at 80° C. for 8 hours.

The dried resin composition was fed into a twin-screw extruder, melted and kneaded at 220° C., introduced into a melt-spinning pack adjusted at a spinning temperature of 220° C., and then spun downwards from an outer annular part of a spinneret having one spinneret hole (a double circular tube type, discharge hole radius: 8.3 mm, slit width: 1.1 mm) under conditions of a discharge rate of 10 g/min. The spun hollow fibers were introduced into a cooling apparatus, cooled by cooling air at 25° C. and at an air velocity of 1.5 m/sec, and then wound by a winder at a draft ratio of 60. The spun hollow fibers were heat treated at 150° C. for 600 seconds and then immersed in water for 12 hours or more, thereby eluting the plasticizer and the structure-forming agent. The physical properties of the resulting separation membrane are shown in Table 1.

Comparative Example 2

22% by mass of the cellulose ester (A2), 77% by mass of dimethyl sulfoxide, and 1% by mass of lithium chloride were dissolved at 120° C. The resulting solution was defoamed under reduced pressure and then spun downwards from spinneret holes (a type of forming one discharge hole by arranging 3 arcuate slit parts) at 50° C. After an elapse of a time of exposure to air for 0.03 seconds, the resultant was solidified in a coagulating bath (warm water at 50° C.) and subsequently washed in water. Thereafter, heat treatment was performed in water of 50° C. for 40 minutes, to obtain a hollow fiber membrane having an outer diameter of 167 μm and a percentage of hollowness of 25%.

The cross-sectional structure in the thickness direction of the resulting hollow fiber membrane was non-homogeneous. The crystal melting temperature was 195° C., and the crystal melting heat amount was 1.0 J/g or less. The breaking strength was 5.5 MPa, and the breakage parameter was 23.1. The physical properties of the resulting separation membrane are shown in Table 1.

TABLE 1

|  | Example 1 | Example 2 | Example 3 | Example 4 | Example 5 | Example 6 |
|---|---|---|---|---|---|---|
| A1 | 40.0 | 40.0 | 40.0 | 40.0 | 40.0 | 50.0 |
| A2 | 0.0 | 0.0 | 0.0 | 0.0 | 0.0 | 0.0 |
| B1 | 29.9 | 29.9 | 29.9 | 29.9 | 29.9 | 19.9 |
| C1 | 30.0 | 30.0 | 30.0 | 30.0 | 30.0 | 30.0 |
| D1 | 0.1 | 0.1 | 0.1 | 0.1 | 0.1 | 0.1 |
| Heat treatment temperature | — | — | — | — | — | — |
| Heat treatment time | — | — | — | — | — | — |
| Drawing temperature (° C.) | 110 | — | — | — | — | — |
| Draw ratio (times) | 1.25 | — | — | — | — | — |
| Solvent used in immersion step | γ-Butyrolactone aqueous solution | γ-Butyrolactone aqueous solution | γ-Butyrolactone aqueous solution | Acetone aqueous solution | Acetonitrile aqueous solution | γ-Butyrolactone aqueous solution |

TABLE 1-continued

|  |  |  |  |  |  |  |
|---|---|---|---|---|---|---|
| Volume fraction of organic solvent in solvent used in immersion step | 65% | 65% | 50% | 65% | 65% | 65% |
| D of solvent used in immersion step | 16 | 16 | 19 | 16 | 15 | 16 |
| Degree of orientation | 1.10 | 1.01 | 1.03 | 1.03 | 1.01 | 1.00 |
| Crystal melting temperature (° C.) | 238 | 235 | 234 | 235 | 238 | 235 |
| Crystal melting heat amount (J/g) | 13.5 | 12.3 | 10.5 | 11.1 | 11.5 | 12.5 |
| Crystallinity | 2.10 | 2.01 | 1.86 | 1.94 | 1.96 | 2.15 |
| τ1/τ2 | 3.8 | 3.6 | 3.4 | 3.5 | 3.5 | 3.6 |
| Average pore diameter R (nm) | 250 | 295 | 118 | 319 | 229 | 327 |
| Presence or absence of homogenous porous structure | Present | Present | Present | Present | Present | Present |
| porosity (%) | 64.3 | 69.5 | 59.8 | 77.4 | 67.0 | 75.3 |
| Breaking strength (MPa) | 16.6 | 13.5 | 17.3 | 9.5 | 13.8 | 12.6 |
| Degree of elongation (%) | 33.8 | 37.4 | 38.8 | 30.0 | 28.5 | 30.0 |
| Breakage parameter | 46.5 | 44.3 | 43.0 | 42.0 | 41.8 | 51.0 |

|  | Example 7 | Example 8 | Example 9 | Example 10 | Example 11 | Comparative Example 1 |
|---|---|---|---|---|---|---|
| A1 | 50.0 | 0.0 | 0.0 | 0.0 | 0.0 | 40.0 |
| A2 | 0.0 | 30.0 | 30.0 | 20.0 | 20.0 | 0.0 |
| B1 | 19.9 | 9.9 | 9.9 | 9.9 | 9.9 | 29.9 |
| C1 | 30.0 | 60.0 | 60.0 | 70.0 | 70.0 | 30.0 |
| D1 | 0.1 | 0.1 | 0.1 | 0.1 | 0.1 | 0.1 |
| Heat treatment temperature | — | — | — | — | — | 150° C. |
| Heat treatment time | — | — | — | — | — | 10 min |
| Drawing temperature (° C.) | — | — | — | — | — | — |
| Draw ratio (times) | — | — | — | — | — | — |
| Solvent used in immersion step | Acetone aqueous solution | γ-Butyrolactone aqueous solution | Acetone aqueous solution | γ-Butyrolactone aqueous solution | Acetone aqueous solution | Water |
| Volume fraction of organic solvent in solvent used in immersion step | 65% | 55% | 55% | 55% | 55% | 0% |
| D of solvent used in immersion step | 16 | 19 | 20 | 19 | 20 | 39 |
| Degree of orientation | 1.00 | 1.01 | 1.01 | 1.00 | 1.02 | 1.03 |
| Crystal melting temperature (° C.) | 234 | 207 | 209 | 205 | 208 | No peak |
| Crystal melting heat amount (J/g) | 12.8 | 11.9 | 14.3 | 12.1 | 13.5 | 0 |
| Crystallinity | 2.18 | 1.92 | 1.98 | 1.94 | 1.95 | 1.03 |
| τ1/τ2 | 3.7 | 2.9 | 3.2 | 3.1 | 2.9 | 2.4 |
| Average pore diameter R (nm) | 308 | 4007 | 4320 | 4965 | 5219 | 1 nm or less |
| Presence or absence of homogenous porous structure | Present | Absent | Absent | Absent | Absent | Present |
| porosity (%) | 69.8 | 78.2 | 79.6 | 81.0 | 82.2 | 18.2 |
| Breaking strength (MPa) | 15.4 | 8.9 | 8.5 | 7.8 | 7.2 | 15.4 |
| Degree of elongation (%) | 42.2 | 28.6 | 26.5 | 11.4 | 11.0 | 13.3 |
| Breakage parameter | 51.0 | 40.8 | 41.7 | 41.1 | 40.4 | 18.8 |

In view of the fact that Example 1 is higher in the strength than Example 2, it is noted that the membrane strength is improved by the drawing treatment. By using the solvent having a solubility parameter distance (D) of the same degree, separation membranes having equivalent membrane strength, degree of elongation, and porosity are obtained. In the case where the solubility parameter distance (D) is large as in Comparative Example 1, the phase separation of the resin does not occur, and therefore, the breaking strength taking into consideration the porosity becomes small. In addition, a clear pore diameter was not observed.

INDUSTRIAL APPLICABILITY

The present invention relates to a separation membrane having high membrane strength and containing a cellulose ester as a main component. The separation membrane of the present invention can be used for water treatment membranes for producing industrial water, drinking water, or the like from seawater, brackish water, sewage, drainage, or the like; medical membranes for artificial kidneys, plasma separation, or the like; membranes for food-beverage industry, such as fruit juice concentration; gas separation membranes for separating exhaust gas, carbonic acid gas, or the like; membranes for electronic industry, such as fuel cell separators; and so on. The separation membrane of the present invention can be preferably used for microfiltration membranes, ultrafiltration membranes, and the like in water treatment.

While the present invention has been described in detail and with reference to specific embodiments thereof, it will be apparent to one skilled in the art that various changes and modifications can be made therein without departing from the spirit and scope thereof.

The present application is based on a Japanese patent application (Patent Application No. 2017-67097) filed on Mar. 30, 2017, the entireties of which are incorporated by reference.

The invention claimed is:

1. A separation membrane comprising a cellulose ester as a main component,
wherein the separation membrane has a structure including a phase comprising the cellulose ester, and pores, has an average pore diameter R of the pores of 0.118 µm or more and 6 µm or less, has a breakage parameter expressed by the following Formula (1) of 40 or more:

Breakage parameter=[{Breaking Strength (MPa)}÷{100−porosity(%)}]−100  (1), has a degree of elongation of 10% or more,
wherein the separation membrane has a porosity (%) of 64.3% or more and 82.2% or less, and
wherein the cellulose ester is a cellulose acetate propionate.

2. The separation membrane according to claim 1, having a crystal melting temperature of 200° C. or higher, and a crystal melting heat amount of 5.0 J/g or more.

3. The separation membrane according to claim 1, having a crystallinity of 1.5 or more.

4. The separation membrane according to claim 1, wherein, for a relaxation time $T_1C$ measured in a solid-state high-resolution nuclear magnetic resonance spectroscopy, a relaxation time ($\tau1$) of a carbonyl carbon and a relaxation time ($\tau2$) of a carbon at 6-position of a glucose ring satisfy the following Relation (2):

$$2.6 \leq \tau1/\tau2 \quad (2).$$

5. The separation membrane according to claim 1, having a homogenous porous structure.

6. The separation membrane according to claim 1, having a bicontinuous structure.

7. The separation membrane according to claim 1, wherein the cellulose ester has a degree of orientation (DO) of 1.05 or more and 1.50 or less, wherein DO is in a main orientation direction defined as a lengthwise direction of the separation membrane.

* * * * *